Oct. 29, 1968
W. C. G. ORTEL
3,407,465
TECHNIQUES FOR CHARTING AND REMOVING
DEFECTS IN THIN FILM CAPACITORS
Filed Dec. 8, 1966
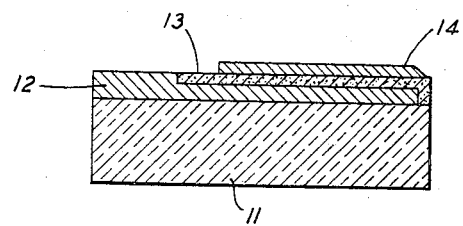
INVENTOR
W. C. G. ORTEL
BY
ATTORNEY

3,407,465
TECHNIQUES FOR CHARTING AND REMOVING DEFECTS IN THIN FILM CAPACITORS
William C. G. Ortel, New York, N.Y., assignor to Bell Telephone Laboratories, Incorporated, Murray Hill, N.J., a corporation of New York
Filed Dec. 8, 1966, Ser. No. 600,086
8 Claims. (Cl. 29—25.42)

This invention relates to a technique for charting defects in planar capacitor structures and curing same.

In recent years, there has been widespread interest in the electronics industry in a class of capacitors commonly referred to as printed capacitors. These structures are typically constructed by depositing a layer of a film-forming metal; for example, tantalum, aluminum, niobium, titanium, and so forth, upon a substrate, anodizing the deposited layer to form an oxide film and finally depositing a counterelectrode in direct contact with the anodized film. The resultant device was found to be polar in nature and represented in the first such device in which a semiconductive layer of manganese dioxide was eliminated, such having been a requirement in solid electrolytic capacitors prepared theretofore.

Initially, it was believed that the printed capacitor represented the ultimate objective in the development of capacitors employing an electrode comprising a film-forming metal. Although this type of device has proven to be eminently suited for use in printed circuitry, its importance in this use has resulted in a continuing effort to improve its characteristics. Accordingly, workers in the art have incessantly sought to develop techniques for minimizing the presence of defects or irregularities in the anodized dielectric film.

One technique for attaining this end, which is described in detail in United States Patent 3,079,536, granted on Feb. 26, 1963, to D. A. McLean, involved contacting the anodized electrode with a nonaqueous electrolyte containing a low concentration of one or more halide ions, biasing the electrode positively for a short period of time, reanodizing the electrode and depositing a counterelectrode thereon. The net result of such treatment was found to be a decrease in the leakage current and a consequent increase in the yield of capacitors meeting the required leakage current standards.

The utility of such technique and refinements thereof has been conclusively demonstrated in higher initial yields as well as in a decided improvement in life test performance. Despite these improvements and the impressive initial conversion of shorted capacitors to acceptable capacitors, such dielectric oxide films are still produced which are not completely amenable to the described etching techniques. The importance of being able to cure all defects is of critical value for integrated multiple capacitor circuits wherein high yields are required, so accounting for the continued efforts in this area. Additionally, prior art procedures directed toward this end in multiple circuits including capacitors integrated with other circuit elements such as resistors, inductors, and so forth, have typically run the risk of destroying the adjacent elements.

In accordance with the present invention, a technique is described for essentially eliminating the presence of internal short circuits in thin film capacitors. The inventive technique involves charting defects in thin film capacitor structures by means of the thermal Marangoni effect and subsequently etching away the counterelectrode at the sites of highly conductive faults. More specifically, the inventive procedure involves coating the counterelectrode of the capacitor structure of interest with a thin layer of a fluid in which a surface tension gradient is induced by the application of a difference of potential between the electrodes of the device, the difference of potential evidencing a current ranging from approximately 10 to 50 milliamperes per fault, whereby voids are generated in the coating at defective sites. Thereafter, conventional etching techniques are utilized to remove the counterelectrode at the defective sites, so resulting in a device essentially free of internal short circuits. Thus, the inventive technique affords one skilled in the art the opportunity of curing capacitor defects subsequent to fabrication of the devices either in a unitary element or a multiple element structure including capacitors integrated with other circuit elements.

The invention will be more readily understood by reference to the following detailed description taken in conjunction with the accompanying drawing, wherein:

The figure is a cross-sectional view of a typical printed capacitor employed in the practice of the present invention.

With further reference now to the figure, there is shown a substrate 11 upon which a layer of a film-forming metal 12 has been deposited, typically by condensation techniques such as vacuum evaporation or cathodic sputtering, as described in detail in United States Patent 2,993,266, issued on July 25, 1961, to R. W. Berry. A dielectric oxide film 13 is shown deposited upon metal layer 12, and a counterelectrode 14 is shown deposited upon and in intimate contact with oxide layer 13.

It will be understood by those skilled in the art that devices of the type shown in the figure are amenable to processing in accordance with the present invention and that the particular technique utilized in fabricating such structures is of no criticality. Thus, it will be appreciated that any convenient procedure for deposition and anodization of the film-forming metal and deposition of the counterelectrode may be employed. Similarly, the film-forming metals, counterelectrode and electrolytes may be selected from among any of the materials commercially available.

The first step in the practice of the present invention involves coating the counterelectrode of the device with a thin film ranging in thickness up to approximately 3 mils of a fluid capable of evidencing a surface tension of approximately zero at temperatures ranging from 10°–30° C. above room temperature. For the purposes of the present invention, room temperature may be defined as including ordinary room or ambient temperatures typically within the range of 20°–25° C. although temperatures slightly below or in excess of this range may be employed. Thus, fluids meeting the requirements of the invention evidence the desired surface tension at temperatures ranging from approximately 30°–55° C. The term "fluid" as employed herein is defined as any substance capable of flowing and is applicable not only to all liquids but also to viscous or melted materials. Typical fluids suitable in this use are isopropanol, xylene, toluene, ethanol, trichlorethylene, methylethylketone, waxes, hydrocarbon and silicone greases, etc. As indicated, a maximum tolerable thickness for the coatings employed is 3 mils, such limit being dictated by considerations relating to the establishment of a tangential temperature gradient at the fluid surface.

Following the application of the fluid coating to the electrode, a difference of potential evidencing a current within the range of 10—50 milliamperes per fault is impressed across the electrodes of the device, so resulting in the generation of a surface tension and thermal gradient in the liquid coating with the concomitant formation of voids at defective sites. In other words, at defective sites in the dielectric oxide layer a current path exists between the base electrode and the counterelectrode, thereby resulting in the heating of the latter at the locus of the defect and the concurrent diminution in surface tension. Thus, the resultant thermal gradient in the liquid coating causes the formation of voids at defective sites, the magnitude of the current utilized in this phase of the operation being dictated by practical considerations. In an alternative embodiment of the present invention the use of an appropriate chemically resistant (to the etchant) viscous fluid permits curing of the defects by direct admittance of etchant through the voids either during or subsequent to the application of the voltage. It will be appreciated by those skilled in the art that the use of currents in excess of 50 milliamperes per fault results in the destruction of the counterelectrode. Although destruction of the counterelectrode at the site of the defects is considered desirable, practical considerations militate against this approach. The lower limit of 10 milliamperes is dictated by considerations relating to the minimum current required to generate the noted thermal gradient.

Following this phase of the invention any suitable technique may be employed to mark the location of the defect. Next, the fluid layer may be removed, the counterelectrode rinsed with distilled water, and the defect eliminated by etching away the counterelectrode. This end may be attained by any convenient means such as the deposition of a photoresist or other suitable mask upon the area of the counterelectrode to be protected and etching away the unwanted metal by any of the known etching procedures (see "Photoengraving," Groesbeck, Doubleday Page & Co., 1924, and "The Ferric Chloride Etching of Copper," Schoffert, Winkler, Vasler and Deubner, 1949, published by Photoengravers Research Inc., Columbus, Ohio).

The present invention is conveniently described by reference to an illustrative example in which an integrated circuit including capacitors is employed.

A glass slide approximately 1 inch square and 40 mils in thickness was used as a substrate. Thereafter, a layer of tantalum nitride 1,000 A. in thickness was deposited upon the slide uniformly by reactive sputtering in accordance with the conventional prior art techniques as described in U.S. Patent 3,242,006, issued on March 22, 1966, to D. Gerstenberg. Following, a layer of nichrome 125 A. in thickness was evaporated upon the tantalum nitride and a layer of gold 20,000 A. in thickness deposited by vacuum evaporation techniques thereon. Next, thin film circuit patterns were generated in the resultant structure by selective etching techniques utilizing photoresistive lacquers and chemical etchants, thereby exposing the tantalum nitride layer in those areas destined for capacitor use, the nichrome and gold underlying layers having been removed. Then, the exposed tantalum nitride was subjected to conventional electrolytic anodization utilizing a 0.01 percent citric acid solution at approximately 100 volts, so resulting in the formation of a tantalum pentoxide layer overlying a layer of tantalum nitride, the latter serving as the base electrode. Thereafter, a back-etching technique was employed to cure as many defects as possible in the dielectric oxide layer, an electrolyte comprising a 0.1 percent, by weight, solution of lithium chloride in methyl alcohol being employed as the electrolyte (as described in U.S. Patent 3,079,536, issued Feb. 26, 1963, to D. A. McLean). Finally, an aluminum counterelectrode 4,000 A. in thickness was deposited upon the dielectric oxide layer. Next, a layer of isopropyl alcohol approximately 2 mils in thickness was applied by means of an eye dropper to the counterelectrode and a difference of potential evidencing a current of approximately 10 milliamperes per fault impressed across the electrodes of the device, so resulting in the generation of a plurality of voids at defective sites in the dielectric oxide layer. The defective sites were then marked by means of a pinpoint and the counterelectrode etched away at such defects utilizing a solution of ferric chloride.

Thitry-two units were prepared in accordance with the procedure described above with the exception that stopcock grease was employed as the fluid medium. Prior to curing the defects in accordance with the present invention, the units were tested by applying an incremental voltage ranging up to one-fourth that of the anodizing voltage and 9 units were found to be defective, as evidenced by an equivalent shunt resistance of the order of 100 ohms. The 9 defective units were treated as described above, etching being effected by means of the introduction of ferric chloride through the voids subsequent to the withdrawal of the voltage. Subsequently, the 9 units were tested as described and the shunt paths were found to be absent.

While the invention has been described in detail in the foregoing specification, and the drawing similarly illustrates the same, it will be understood by those skilled in the art that the aforesaid is by way of illustration only and that the inventive concept may be extended to include any thin film capacitor; for example, those including a foil base, printed capacitors, and so forth, and to devices including dielectrics other than oxides of the base metal such as silicon oxide, and so forth.

What is claimed is:

1. A method for eliminating internal short circuits in a thin film capacitor including successively a substrate member, a layer of a conductor, a layer of a dielectric material and a counterelectrode which comprises the steps of coating said counterelectrode with a thin film of a fluid in which a surface tension gradient can be induced by heating to increase the surface tension, impressing a difference of potential between the electrodes of said capacitor, at a temperature ranging from 30°–55° C., said difference of potential evidencing a current ranging from 10–50 milliamperes per fault, thereby generating voids in said liquid coating at the sites of highly conductive faults and removing said counterelectrode by etching at the sites of said faults.

2. A method in accordance with the procedure of claim 1 wherein said liquid coating is less than 3 mils in thickness.

3. A method in accordance with claim 1 wherein said fluid is isopropyl alcohol.

4. A method in accordance with claim 1 wherein said conductor is tantalum nitride.

5. A method in accordance with claim 1 wherein said dielectric material is silicon oxide.

6. A method in accordance with claim 1 wherein said fluid is a chemically resistant substance which functions as an etching mask.

7. A method in accordance with claim 6 wherein said fluid is viscous and said voids remain after removal of the voltage.

8. A method in accordance with claim 1 wherein said conductor is a film-forming metal and said dielectric is an oxide of said film-forming metal.

References Cited

UNITED STATES PATENTS

| 2,607,825 | 8/1952 | Eisler | 29—25.42 |
|---|---|---|---|
| 2,865,083 | 12/1958 | Kater et al. | 29—25.42 |
| 3,234,442 | 2/1966 | Maissel et al. | 29—25.42 |

JOHN F. CAMPBELL, *Primary Examiner.*

RICHARD BERNARD LAZARUS, *Assistant Examiner.*